(12) United States Patent
Kushida

(10) Patent No.: US 9,022,087 B2
(45) Date of Patent: May 5, 2015

(54) RUBBER COMPOSITION FOR TIRE TREADS

(75) Inventor: Naoki Kushida, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 14/241,107

(22) PCT Filed: Aug. 6, 2012

(86) PCT No.: PCT/JP2012/070008
§ 371 (c)(1),
(2), (4) Date: Feb. 26, 2014

(87) PCT Pub. No.: WO2013/031488
PCT Pub. Date: Mar. 7, 2013

(65) Prior Publication Data
US 2014/0213708 A1 Jul. 31, 2014

(30) Foreign Application Priority Data
Aug. 26, 2011 (JP) .................................. 2011-185014

(51) Int. Cl.
| | | |
|---|---|---|
| *B60C 1/00* | (2006.01) | |
| *C08K 5/548* | (2006.01) | |
| *C08L 9/06* | (2006.01) | |
| *C08L 21/00* | (2006.01) | |
| *C08K 3/36* | (2006.01) | |

(52) U.S. Cl.
CPC . *C08K 5/548* (2013.01); *C08L 9/06* (2013.01); *B60C 1/0016* (2013.01); *C08L 21/00* (2013.01); *C08K 3/36* (2013.01)

(58) Field of Classification Search
None
See application file for complete search history.

(56) References Cited

U.S. PATENT DOCUMENTS

| | | | |
|---|---|---|---|
| 5,409,969 A | 4/1995 | Hamada | |
| 5,496,883 A | 3/1996 | Hamada | |
| 5,792,825 A * | 8/1998 | Karrer et al. .................. 528/27 |
| 7,368,584 B2 | 5/2008 | Chaves et al. | |
| 7,608,667 B2 * | 10/2009 | Endo ............................. 525/232 |
| 8,476,374 B2 | 7/2013 | Omura et al. | |
| 2003/0199619 A1 * | 10/2003 | Cruse ............................ 524/261 |
| 2006/0004144 A1 * | 1/2006 | Kimura et al. ................ 525/198 |
| 2007/0293619 A1 * | 12/2007 | Jacoby et al. ................. 524/493 |
| 2008/0033103 A1 | 2/2008 | Kameda et al. | |
| 2011/0144236 A1 * | 6/2011 | Mihara ......................... 523/158 |
| 2011/0180195 A1 * | 7/2011 | Hergenrother et al. ....... 152/525 |
| 2011/0319519 A1 * | 12/2011 | Sone et al. .................... 523/155 |
| 2013/0253113 A1 | 9/2013 | Omura et al. | |

FOREIGN PATENT DOCUMENTS

| | | |
|---|---|---|
| CN | 101522696 A | 9/2009 |
| JP | 03-252433 A | 11/1991 |
| JP | 09-268238 A | 10/1997 |
| JP | 2000-230082 A | 8/2000 |
| JP | 2009-126907 A | 6/2009 |
| JP | 2010-500408 A | 1/2010 |
| JP | 2011-032402 A | 2/2011 |
| WO | 2006/028254 A1 | 3/2006 |
| WO | 2007/119675 A1 | 10/2007 |

OTHER PUBLICATIONS

German Office Action dated Jul. 29, 2014 issued to the corresponding DE Patent Application No. 11 2012 003 530.5 and the English translation thereof.
Chinese Office Action dated Oct. 13, 2014 issued to the corresponding CN Patent Application No. 201280041743.2.

* cited by examiner

*Primary Examiner* — Marc Zimmer
(74) *Attorney, Agent, or Firm* — Carrier Blackman & Associates, P.C.; Joseph P. Carrier; Anne G. Sabourin

(57) ABSTRACT

A rubber composition for tire treads is obtained by blending, per 100 parts by mass of a diene rubber, 5 to 150 parts by mass of silica and 0.5 to 20 parts by mass of a silicone oligomer represented by the following siloxane average formula (1): $(X)_a(Y)_b(R^1)_c(R^2)_d SiO_{(4-a-b-c-d)/2}$ (wherein X is a mercapto group-containing organic group; Y is a hydrolyzable group, $R^1$ is a monovalent hydrocarbon group having from 4 to 10 carbon atoms, $R^2$ is a monovalent hydrocarbon group having from 1 to 3 carbon atoms, $0<a<1$, $0<b<3$, $0<c<2$, $0≤d<2$, and $0<a+b+c+d<4$). The diene rubber contains an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%.

17 Claims, 1 Drawing Sheet

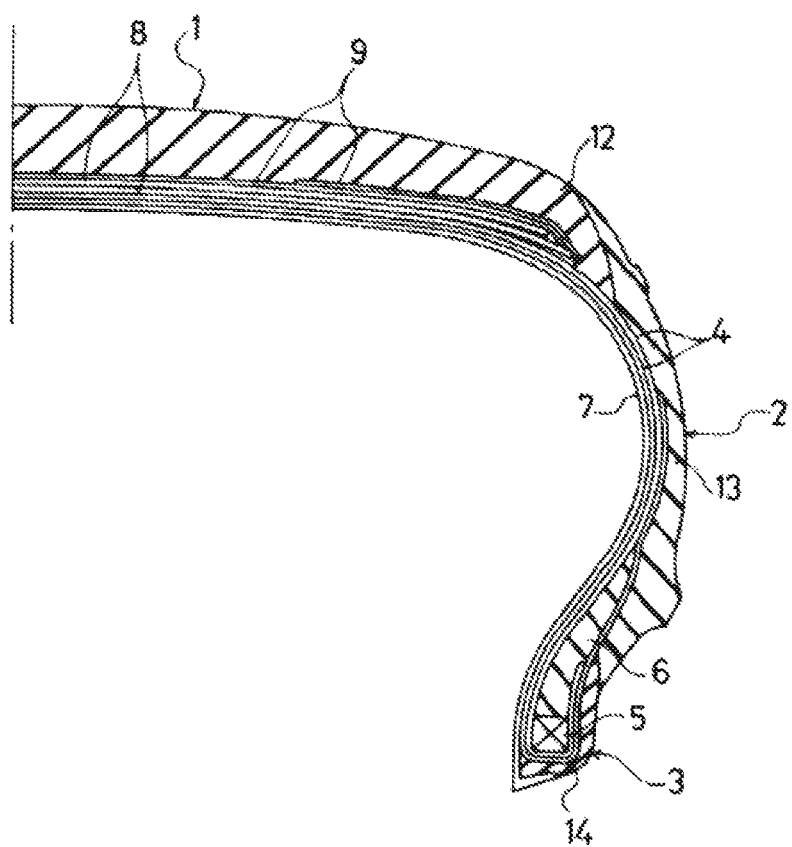

RUBBER COMPOSITION FOR TIRE TREADS

TECHNICAL FIELD

The present invention relates to a rubber composition for use in tire treads.

BACKGROUND OF THE INVENTION

A great many performance attributes are demanded of tires. In particular, there is a demand for steering stability during high-speed traveling, stability on wet road surfaces, reduction in rolling resistance to enable greater automobile fuel efficiency, and improvement in friction resistance.

Conventionally, in order to achieve both a reduction in rolling resistance as well as stability on wet road surfaces, in particular, silica is widely used as a reinforcing filler. A typical known technique for improving the dispersibility of silica is to increase the mixing time or to blend a large amount of a silane coupling agent into the silica. However, when the mixing time is increased, the gel content increases excessively, and the rolling resistance is diminished, which is not preferable. When a large amount of a silane coupling agent is blended into the silica, the scorch time becomes too short, and the extrudability of the treads is diminished.

On the other hand, although mercapto-based silane coupling agents increase the dispersibility of silica and improve the physical properties, such agents have the problem that the workability of the silica is diminished. Rubber compositions containing diene rubber, silica, mercapto silane coupling agents represented by specific formulas, and the like have been proposed (for example, Patent Document 1).

PRIOR ART DOCUMENTS

Patent Documents

Patent Document 1: Japanese Unexamined Patent Application Publication No. 2011-32402A

SUMMARY OF THE INVENTION

Problems to be Solved by the Invention

However, the present inventors discovered that it is difficult for rubber compositions containing diene rubber, silica, mercapto silane coupling agents represented by specific formulas, or the like to improve physical properties (stability on wet road surfaces, reduction of rolling resistance, and balance thereof) while ensuring workability.

Therefore, an object of the present invention is to provide a rubber composition for tire treads capable of improving physical properties (specifically, stability on wet road surfaces, reduction of rolling resistance, and balance thereof; same hereinafter) while ensuring workability.

Means to Solve the Problem

As a result of conducting dedicated research to solve the problem described above, the present inventors completed the present invention with the discovery of a novel silicone oligomer capable of further improving physical properties while ensuring workability and the discovery that a composition containing such a silicone oligomer can be used as a rubber composition for tire treads capable of improving physical properties while ensuring workability.

Specifically, the present invention provides the following 1 to 9.

1. A rubber composition for tire treads obtained by blending, per 100 parts by mass of a diene rubber, 5 to 150 parts by mass of silica and 0.5 to 20 parts by mass of a silicone oligomer represented by the following siloxane average formula (1):

$$(X)_a(Y)_b(R^1)_c(R^2)_d SiO_{(4-a-b-c-d)/2} \qquad (1)$$

(wherein X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms, $0<a<1$, $0<b<3$, $0<c<2$, $0\leq d<2$, and $0<a+b+c+d<4$);

the diene rubber containing an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%.

2. The rubber composition for tire treads according to 1 described above, wherein in the siloxane average formula (1), a, b, c, and d each satisfy $0<a<1$, $0<b<2$, $0<c<1$, and $0\leq d<1$.

3. The rubber composition for tire treads according to 1 or 2 described above, wherein at least a portion of the silica is silica with an $N_2SA$ of 100 to 300 $m^2/g$.

4. The rubber composition for tire treads according to any one of 1 to 3 described above, wherein in the siloxane average formula (1), $R^1$ is the following organic group (2), and X is the following organic group (3).

$$-C_8H_{17} \qquad (2)$$

$$-C_3H_6SH \qquad (3)$$

5. The rubber composition for tire treads according to any one of 1 to 4 described above, wherein in the siloxane average formula (1), a, b, c, and d each satisfy $0<a<0.5$, $1.2<b<1.6$, $0.5<c<1$, and $0\leq d\leq 0.1$.

6. The rubber composition for tire treads according to any one of 1 to 5 described above, wherein the molecular weight of the silicone oligomer is from 500 to 2000.

7. The rubber composition for tire treads according to any one of 3 to 6 described above, wherein $N_2SA$ is from 150 to 300 $m^2/g$.

8. The rubber composition for tire treads according to any one of 1 to 7 described above, further containing a silane having a polysulfide structure and a hydrolyzable group.

9. A pneumatic tire having tire treads formed using the rubber composition for tire treads described in any one of 1 to 8 described above.

Effects of the Invention

The rubber composition for tire treads according to the present invention is able to improve physical properties while ensuring workability. The pneumatic tire of the present invention has excellent physical properties.

BRIEF DESCRIPTION OF THE DRAWING

FIG. 1 is a partial cross-sectional view in a tire meridian direction illustrating an example of an embodiment of a pneumatic tire in which a rubber composition for use in tires of the present invention is used.

BEST MODE FOR CARRYING OUT THE INVENTION

The present invention is described in detail below.

The rubber composition for tire treads according to the present invention is:

a rubber composition for tire treads obtained by blending, per 100 parts by mass of a diene rubber, 5 to 150 parts by mass of silica and 0.5 to 20 parts by mass of a silicone oligomer represented by the following siloxane average formula (1):

$$(X)_a(Y)_b(R^1)_c(R^2)_d SiO_{(4-a-b-c-d)/2} \quad (1)$$

(wherein X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms, $0<a<1$, $0<b<3$, $0<c<2$, $0\le d<2$, and $0<a+b+c+d<4$);

the diene rubber containing an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%.

The diene rubber will be described hereinafter.

In the present invention, from the perspective of being able to improve physical properties while ensuring workability, the diene rubber contains an aromatic vinyl-conjugated diene copolymer having an aromatic vinyl content of 20 to 45 mass % and a vinyl bond content in the conjugated diene of 10 to 50%.

The aromatic vinyl-conjugated diene copolymer is a copolymer obtained using a monomer unit containing an aromatic vinyl monomer and a conjugated diene monomer. Examples include styrene butadiene rubber, styrene isoprene rubber, styrene isoprene butadiene rubber, α-methyl styrene butadiene rubber, α-methyl styrene isoprene rubber, and α-methyl styrene isoprene butadiene rubber. Of these, styrene butadiene rubber is preferable from the perspective that it is easy to obtain and has excellent workability and physical properties.

In the present invention, the aromatic vinyl content (for example, the styrene content) of the aromatic vinyl-conjugated diene copolymer is from 20 to 45 mass % and preferably from 23 to 42 mass % from the perspective of being able to improve physical properties while ensuring workability and having excellent stability on wet road surfaces, in particular.

In addition, in the present invention, the 1,2-bond content (for example, the amount of 1,2-bonds formed by butadiene) in the conjugated diene part of the aromatic vinyl-conjugated diene copolymer is from 10 to 50% and preferably from 25 to 48% from the perspective of having excellent workability, being able to improve physical properties, and having excellent scorch stability.

The weight average molecular weight of the aromatic vinyl-conjugated diene copolymer is preferably from 100,000 to 2,000,000 and more preferably from 300,000 to 1,500,000 from the perspective of having superior workability, being able to further improve physical properties, and having excellent rolling resistance. The weight average molecular weight (Mw) of the aromatic vinyl-conjugated diene copolymer is measured in terms of standard polystyrene by gel permeation chromatography (GPC) using tetrahydrofuran as a solvent.

The production of the aromatic vinyl-conjugated diene copolymer is not particularly limited. Examples thereof include conventionally known methods. The aromatic vinyl and conjugated diene serving as monomer units used when producing the aromatic vinyl-conjugated diene copolymer are not particularly limited. Examples of the conjugated diene monomer unit include 1,3-butadiene, isoprene(2-methyl-1,3-butadiene), 2,3-dimethyl-1,3-butadiene, 2-chloro-1,3-butadiene, 1,3-pentadiene, and the like. Examples of the aromatic vinyl monomer unit include styrene, 2-methylstyrene, 3-methylstyrene, 4-methylstyrene, alpha-methylstyrene, 2,4-dimethylstyrene, 2,4-diisoisopropylstyrene, 4-tert-butylstyrene, divinylbenzene, tert-butoxystyrene, vinylbenzyldimethylamine, (4-vinylbenzyl)dimethylaminoethyl ether, N,N-dimethyl aminoethylstyrene, vinyl pyridine, and the like.

In the present invention, the diene rubber may further contain other diene rubbers in addition to the aromatic vinyl-conjugated diene copolymer having the characteristics described above as rubber components. Examples of other diene rubbers include natural rubber, styrene rubber other than that described above, isoprene rubber, butadiene rubber, butyl rubber, and halogenated butyl rubber. Of these, natural rubber and butadiene rubber are preferable from the perspective of having excellent rolling resistance.

In the present invention, the amount of the aromatic vinyl-conjugated diene copolymer is at least 50 mass %, preferably from 55 to 100 mass %, and more preferably from 60 to 100 mass % of the total amount of the diene rubber from the perspective of being able to improve physical properties while ensuring workability and having excellent stability on wet road surfaces.

The content when the other diene rubber is a butadiene rubber is preferably not more than 45 mass % and more preferably is from 5 to 40 mass % of the entire amount of the diene rubber from the perspective of being able to further improve physical properties while ensuring workability and having excellent rolling resistance.

A single diene rubber can be used, or a combination of two or more types can be used. There is no particular limitation on the production of the diene rubber.

Silica will be described hereinafter. The silica used in the present invention is not particularly limited. Examples thereof include wet silica (hydrous silicic acid), dry silica (silicic anhydride), calcium silicate, and aluminum silicate. Of these, wet silica (hydrous silicic acid) is preferable from the perspective of being able to further improve physical properties while ensuring workability and having excellent rolling resistance.

The silica preferably contains at least silica with an $N_2SA$ (nitrogen absorption specific surface area) from 100 to 300 $m^2/g$ and more preferably contains silica with an $N_2SA$ from 150 to 300 $m^2/g$ from the perspective of being able to further improve physical properties while ensuring workability and having excellent stability on wet road surfaces and rolling resistance.

A single silica can be used, or a combination of two or more types can be used.

In the present invention, the amount of silica used is from 5 to 150 parts by mass per 100 parts by mass of the diene rubber from the perspective of being able to improve physical properties while ensuring workability and having excellent stability on wet road surfaces and rolling resistance. For the same reason, the amount is preferably from 20 to 140 parts by mass and more preferably from 35 to 140 parts by mass.

The silicone oligomer will be described hereinafter. The silicone oligomer blended into the composition of the present invention is represented by the following siloxane average formula (1).

$$(X)_a(Y)_b(R^1)_c(R^2)_d SiO_{(4-a-b-c-d)/2} \quad (1)$$

In the formula, X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms, $0<a<1$, $0<b<3$, $0<c<2$, $0\le d<2$, and $0<a+b+c+d<4$.

X is a mercapto group-containing organic group. The organic group to which the mercapto group bonds is not particularly limited. Examples include aliphatic hydrocarbon groups, cycloaliphatic hydrocarbon groups, aromatic hydrocarbon groups, and combinations thereof. The organic group to which the mercapto group bonds may be a straight-chain or branched group. Examples include mercapto group-containing aliphatic hydrocarbon groups such as mercapto methyl groups, mercapto ethyl groups, mercapto trimethylene groups, mercapto propylene groups, mercapto butyl groups, mercapto pentyl groups, mercapto hexyl groups, mercapto heptyl groups, mercapto octyl groups, mercapto nonyl groups, and mercapto decyl groups; and mercapto group-containing cycloaliphatic hydrocarbon groups such as mercapto cyclohexyl groups.

Of these, X is preferably the following organic group (3) from the perspective that it is easy to obtain and has excellent silica dispersibility.

$$—C_3H_6SH \quad (3)$$

Y is a hydrolyzable group. Examples of the hydrolyzable group include alkoxy groups, phenoxy groups, carboxy groups, and alkenyloxy groups. A specific example is an alkoxy group having from 1 to 4 carbon atoms, examples of which include methoxy groups, ethoxy groups, propoxy groups, isopropoxy groups, and butoxy groups. The hydrolyzable group may also be one of the aforementioned hydrocarbon groups that is lacking an OH group.

$R^1$ is a monovalent hydrocarbon group having from 4 to 10 carbon atoms. Examples of monovalent hydrocarbon groups having from 4 to 10 carbon atoms include aliphatic hydrocarbon groups, cycloaliphatic hydrocarbon groups, aromatic hydrocarbon groups, and combinations thereof. The monovalent hydrocarbon group may be a straight-chain or branched group. Specific examples include aliphatic hydrocarbon groups such as butyl groups, pentyl groups, hexyl groups, heptyl groups, octyl groups, nonyl groups, and decyl groups; and cycloaliphatic groups such as cyclohexyl groups. The monovalent hydrocarbon group having from 4 to 10 carbon atoms may lack hetero-atoms such as oxygen atoms, nitrogen atoms, or sulfur atoms.

Of these, $R^1$ is preferably the following organic group (2) from the perspective that it is easy to obtain and has excellent silica dispersibility.

$$—C_8H_{17} \quad (2)$$

$R^2$ is a monovalent hydrocarbon group having from 1 to 3 carbon atoms. Specific examples include methyl groups, ethyl groups, propyl groups, and isopropyl groups.

In the formula, a satisfies $0<a<1$ and preferably $0<a<0.5$ from the perspective of having excellent silica dispersibility while ensuring workability.

In the formula, b satisfies $0<b<3$, preferably $0<b<2$, and more preferably $1.2<b<1.6$ from the perspective of having excellent silica dispersibility.

In the formula, c satisfies $0<c<2$, preferably $0<c<1$, and more preferably $0.5<c<1$ from the perspective of having excellent silica dispersibility.

In the formula, d satisfies $0\leq d<2$, preferably $0\leq d<1$, and more preferably $0\leq d\leq 0.1$ from the perspective of having excellent silica dispersibility.

In the formula, $a+b+c+d$ satisfies $0<a+b+c+d<4$ and preferably $1.7<a+b+c+d<3.2$ from the perspective of having excellent silica dispersibility.

In the siloxane average formula (1), it is preferable for $0<a<1$, $0<b<2$, $0<c<2$, and $0\leq d<1$ and more preferable for $0<a<0.5$, $1.2<b<1.6$, $0.5<c<1$, and $0\leq d\leq 0.1$ from the perspective of having excellent silica dispersibility while ensuring workability.

The molecular weight of the silicone oligomer is preferably from 500 to 2000 and more preferably from 700 to 1500 from the perspective of having excellent silica dispersibility while ensuring workability. The molecular weight of the silicone oligomer is the weight-average molecular weight determined in terms of polystyrene by gel permeation chromatography (GPC) using toluene as a solvent.

The mercapto equivalent weight of the silicone oligomer determined by an acetic acid/potassium iodide/potassium iodate addition/sodium thiosulfate solution titration method is preferably from 550 to 700 g/mol and more preferably from 600 to 650 g/mol from the perspective of having excellent vulcanization reactivity.

The production of the silicone oligomer is not particularly limited. For example, a method of producing the silicone oligomer by reacting a mercaptosilane represented by the following formula (A) and an organosilane represented by the following formula (B) may be used.

Formula 1

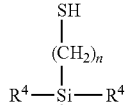

(A)

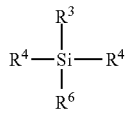

(B)

In the formulas, $R^5$ is an alkoxy group having from 1 to 4 carbon atoms (for example, a methoxy group or an ethoxy group), a monovalent hydrocarbon group having from 1 to 3 carbon atoms, or a monovalent hydrocarbon group having from 4 to 10 carbon atoms; $R^6$ is an alkoxy group having from 1 to 4 carbon atoms (for example, a methoxy group or an ethoxy group), a monovalent hydrocarbon group having from 1 to 3 carbon atoms, or a monovalent hydrocarbon group having from 4 to 10 carbon atoms; $R^3$ is a monovalent hydrocarbon group having from 4 to 10 carbon atoms; n is an integer from 1 to 8 (preferably an integer from 1 to 3 and more preferably 3); $R^4$ is a monovalent hydrocarbon group having from 1 to 4 carbon atoms (for example, a methoxy group or an ethoxy group); and a plurality of $R^4$ moieties may be the same or different. $R^5$ and $R^6$ are preferably alkoxy groups having from 1 to 4 carbon atoms (for example, a methoxy group or an ethoxy group) from the perspective of having excellent silica dispersibility while ensuring workability. In formula (A), —(CH$_2$)n-SH is an example of X in the siloxane average formula (1), and —(CH$_2$)n-SH in formula (A) may be substituted for X in formula (1). The monovalent hydrocarbon groups having from 1 to 4 carbon atoms in formulas (A) and (B) correspond to the monovalent hydrocarbon group having from 4 to 10 carbon atoms in formula (1).

An example of the mercaptosilane represented by formula (A) is mercaptopropyl triethoxysilane, mercaptopropyl trimethoxysilane, or mercaptopropyl methyl diethoxysilane.

An example of the organosilane represented by formula (B) is propyl triethoxysilane, propyl trimethoxysilane, propyl methyl diethoxysilane, dimethyl diethoxysilane, octyl triethoxysilane, octyl trimethoxysilane, decyl triethoxysilane, or decyl trimethoxysilane.

One preferable mode is to react the compound represented by formula (A) and the compound represented by formula (B) in the solvent in the presence of a catalyst.

Examples of solvents include aromatic solvents (for example, chlorobenzene), halogenated hydrocarbons (for example, chloroform or methylene chloride), ethers (for example, diisopropyl ether, tert-butyl methyl ether, tetrahydrofuran, or diethyl ether), acetonitrile, carboxylic acid esters (for example, ethyl acetate, methyl acetate, or isopropyl acetate), and alcohols (for example, ethanol, n-propanol, i-propanol, n-butanol, sec-butanol, or tert-butanol). Of these, ethanol and i-propanol are preferable from the perspective of having excellent hydrolyzability and reactive product stability.

An example of a catalyst is an acidic, basic, or neutral catalyst.

An example of an acidic catalyst is a diluted aqueous mineral acid (for example, a hydrochloric acid aqueous solution) or a Lewis acid aqueous solution.

Examples of basic catalysts include organic bases, a specific example of which is triethylamine, tetramethylpiperidine, tributylamine, or pyridine; inorganic bases, examples of which include NaOH, KOH, $Ca(OH)_2$, $Na_2CO_3$, $K_2CO_3$, $CaCO_3$, CaO, $NaHCO_2$, and $KHCO_3$; alcoholates, an example of which is $NaOCH_3$ or $NaOC_2H_5$; and carboxylates, examples of which include potassium acetate and sodium acetate. Of these, KOH and potassium acetate are preferable from the perspective of having an excellent catalytic effect and compatibility with the reaction system.

HCl, for example, may be used as a catalyst for the silane hydrolysis reaction (and or partial condensation), and KOH, for example, may be used as a catalyst for silanol condensation (oligomerization).

The amount of the catalyst (the respective amounts when a catalyst for the silane hydrolysis reaction and a catalyst for the silanol condensation reaction are used in combination) is preferably from 0.001 to 0.050 (units: molar equivalents) with respect to the silane used when producing the silicone oligomer (for example, when the compound represented by formula (A) and the compound represented by formula (B) are used, this is the total amount thereof; same hereinafter) from the perspective having excellent reactivity.

The reaction conditions—the amount of water added, in particular—may be selected so that the reaction product is polycondensed and so that no solids are formed. The amount of water is preferably from 0.50 to 0.95 (units: molar equivalents) and more preferably from 0.70 to 0.85 with respect to silane from the perspective of obtaining a silicone oligomer having excellent dispersibility into the silica while ensuring workability. The amount of water used in the working examples of this application are within the ranges described above.

After the reaction is complete, the easily vaporized components are removed, and the catalyst is inactivated or removed by a conventional method.

A single silicone oligomer can be used, or a combination of two or more types can be used.

In the present invention, the amount of the silicone oligomer is from 0.5 to 20 parts by mass, preferably from 1.0 to 18 parts by mass, and more preferably from 2.0 to 16 parts by mass per 100 parts by mass of the diene rubber from the perspective of being able to improve physical properties while ensuring workability.

The rubber composition for tire treads according to the present invention preferably further contains a silane having a polysulfide structure and a hydrolyzable group (hereinafter also referred to as polysulfide silane). Here, specific examples of hydrolyzable groups are as described above. When the polysulfide silane described above is added, it is possible to improve the workability and further improve the physical properties due to the interaction with the silicone oligomer.

The polysulfide silane described above is not particularly limited but is preferably a polysulfide silane represented by the following formula (4) from the perspective of being able to improve the workability and to further improve the physical properties.

Formula 2

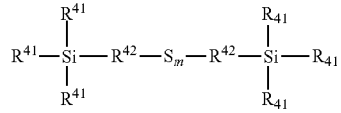

(4)

In formula (4), $R^{41}$ is hydrogen, an alkyl group having from 1 to 3 carbon atoms, or a hydrolyzable group. A plurality of $R^{41}$ moieties may be the same or different. At least one of the plurality of $R^{41}$ moieties is a hydrolyzable group.

In formula (4), $R^{42}$ is an alkylene group having from 1 to 8 carbon atoms. A plurality of $R^{42}$ moieties may be the same or different.

In formula (4), m is a number from 2 to 8 as an average value. Here, the average value of m refers to a value determined by averaging m (including numbers after the decimal point) for the entire amount of polysulfide silane contained in the rubber composition for tire treads according to the present invention.

In formula (4), $R^{41}$ is preferably a hydrolyzable group, more preferably an alkoxy group having from 1 to 3 carbon atoms, and even more preferably an ethoxy group.

In formula (4), $R^{42}$ is preferably an alkylene group having from 2 to 6 carbon atoms, more preferably an alkylene group having from 2 to 4 carbon atoms, and even more preferably a propylene group.

In formula (4), m is preferably a number from 2 to 6, more preferably a number from 3 to 5, and even more preferably 4 as an average value.

In the present invention, the content of the polysulfide silane described above is preferably from 0.1 to 10 parts by mass per 100 parts by mass of the diene rubber from the perspective of being able to improve the workability and being able to further improve the physical properties.

The rubber composition for tire treads according to the present invention may further contain additives as necessary within a scope that does not inhibit the effect or purpose thereof. Examples of additives include various compounding agents typically used in rubber compositions for tire treads such as silicone oligomers other than that contained in the invention of the present application, fillers other than silica (for example, carbon black), silane coupling agents, zinc oxide, stearic acid, antiaging agents, processing aids, aroma oils, liquid polymers, terpene-based resins, thermosetting resins, vulcanizing agents, and vulcanization accelerators. These additives may be blended according to any common method to form the rubber composition and may be used in vulcanization or crosslinking. The compounded amounts of the additives may be any conventional standard amounts as long as the amounts do not depart from the intended purpose of the present invention.

The conditions for vulcanizing the rubber composition for tire treads according to the present invention are not particularly limited.

The rubber composition for tire treads according to the present invention can be advantageously used in pneumatic tires (for example, tire treads).

The pneumatic tire of the present invention will be described hereinafter. The pneumatic tire of the present invention is a pneumatic tire having tire treads formed by using the rubber composition for tire treads according to the present invention.

The pneumatic tire of the present invention will be described hereafter with reference to the attached drawings.

FIG. 1 illustrates an example of an embodiment of a pneumatic tire in which a rubber composition for tire treads is used. In FIG. 1, 1 is a tread portion; 2 is a side wall portion; and 3 is a bead portion.

In FIG. 1, two layers of a carcass layer 4, formed by arranging reinforcing cords extending in a tire radial direction in a tire circumferential direction at a predetermined pitch and embedding these reinforcing cords in a rubber layer, are disposed extending between left and right side bead portions 3. Both ends thereof are made to sandwich a bead filler 6 around a bead core 5 that is embedded in the bead portions 3 and are folded back in a tire axial direction from the inside to the outside. An inner liner layer 7 is disposed inward of the carcass layers 4. Two layers of a belt layer 8, formed by arranging reinforcing cords extending inclined to the tire circumferential direction in the tire axial direction at a predetermined pitch and embedding these reinforcing cords in a rubber layer, are disposed on an outer circumferential side of the carcass layer 4 of the tread portion 1. The reinforcing cords of the two layers of the belt layer 8 cross interlamilarly so that the incline directions with respect to the tire circumferential direction are opposite each other. A belt cover layer 9 is disposed on an outer circumferential side of the belt layers 8. The tread portion 1 is formed from a tread rubber layer 12 on an outer circumferential side of the belt cover layer 9. The tread rubber layer 12 is formed from the rubber composition for tire treads according to the present invention. A side rubber layer 13 is disposed outward of the carcass layer 4 in each side wall portion 2, and a rim cushion rubber layer 14 is provided outward of the portion of the carcass layers 4 that are folded back around each of the bead portions 3.

The pneumatic tire of the present invention is not particularly limited with the exception that the rubber composition for tire treads according to the present invention is used for the treads of a pneumatic tire, and, for example, the tire can be produced in accordance with a conventionally known method. In addition to ordinary air or air with an adjusted oxygen partial pressure, inert gasses such as nitrogen, argon, and helium can be used as the gas with which the tire is filled.

EXAMPLES

The present invention is described below in detail using working examples, but the present invention is not limited to such working examples.
<Production of Silicone Oligomers 1 to 4>
(Silicone Oligomer 1)

After 238.4 g (1.0 mol) of γ-mercapto propyl triethoxysilane, 553.0 g (2.0 mol) of octyl triethoxysilane, and 1413 g of ethanol were placed in a 3 L separable flask provided with an agitator, a reflux condenser, a dropping funnel, and a thermometer, 41.5 g (2.3 mol) of a 0.5 N—HCl aqueous solution was added in a dropwise manner at room temperature while stirring. After the solution was stirred for 2 hours at 80° C., 20.0 g of a 5% KOH/EtOH solution added in a dropwise manner and stirred for 2 hours at 80° C. The solution was then distilled under reduced pressure and filtered to obtain 652.5 g of a clear, colorless liquid. As a result of measuring the resulting silicone oligomer by GPC, the average molecular weight was 850, and the average degree of polymerization was 4.1 (preset degree of polymerization: 4.0). In addition, as a result of measuring the mercapto equivalent weight by an acetic acid/potassium iodide/potassium iodate addition/sodium thiosulfate solution titration method, the equivalent weight was 630 g/mol, and it was thus confirmed that the preset mercapto group content was achieved. The silicone oligomer obtained as described above is represented by the following average composition formula.

(HS—C$_3$H$_6$—)$_{0.33}$(C$_2$H$_5$O)$_{1.50}$(C$_8$H$_{17}$)$_{0.67}$SiO$_{0.75}$ The resulting silicone oligomer was used as silicone oligomer 1.
(Silicone Oligomer 2)

After 238.4 g (1.0 mol) of γ-mercapto propyl triethoxysilane, 553.0 g (2.0 mol) of octyl triethoxysilane, and 1413 g of ethanol were placed in a 3 L separable flask provided with an agitator, a reflux condenser, a dropping funnel, and a thermometer, 45.0 g (2.3 mol) of a 0.5 N—HCl aqueous solution was added in a dropwise manner at room temperature while stirring. After the solution was stirred for 2 hours at 80° C., 21.4 g of a 5% KOH/EtOH solution was added in a dropwise manner and stirred for 2 hours at 80° C. The solution was then distilled under reduced pressure and filtered to obtain 614.6 g of a clear, colorless liquid. As a result of measuring the resulting silicone oligomer by GPC, the average molecular weight was 1230, and the average degree of polymerization was 6.1 (preset degree of polymerization: 6.0). In addition, as a result of measuring the mercapto equivalent weight by an acetic acid/potassium iodide/potassium iodate addition/sodium thiosulfate solution titration method, the equivalent weight was 610 g/mol, and it was thus confirmed that the preset mercapto group content was achieved. The silicone oligomer obtained as described above is represented by the following average composition formula.

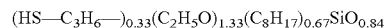
(HS—C$_3$H$_6$—)$_{0.33}$(C$_2$H$_5$O)$_{1.33}$(C$_8$H$_{17}$)$_{0.67}$SiO$_{0.84}$ The resulting silicone oligomer was used as silicone oligomer 2.
(Silicone Oligomer 3)

After 553.0 g (2.0 mol) of octyl triethoxy silane and 757 g of ethanol were placed in a 3 L separable flask provided with a reflux condenser, a dropping funnel, and a thermometer, a mixed solution containing 18.0 g (1.0 mol) of 0.5 N—HCl aqueous solution and 42 g of ethanol was added in a dropwise manner at room temperature while stirring, and the solution was then stirred for 30 minutes at room temperature. After 238.4 g (1.0 mol) of γ-mercapto propyl triethoxysilane and 300 g of ethanol were further placed in a 1 L separable flask provided with an agitator, a reflux condenser, a dropping funnel, and a thermometer, a mixed solution containing 9.7 g (0.54 mol) of 0.5 N—HCl aqueous solution and 23 g of ethanol was added in a dropwise manner at room temperature while stirring and then stirred for 30 minutes at room temperature. The reaction solution was then added in a dropwise manner to the previous 3 L separable flask. After a mixed solution containing 13.8 g (0.77 mol) of 0.5 N—HCl aqueous solution and 32 g of ethanol was then added in a dropwise manner and stirred for 2 hours at 80° C., 20.0 g of a 5% KOH/EtOH solution was added in a dropwise manner and stirred for 2 hours at 80° C. The reaction solution was then distilled under reduced pressure and filtered to obtain 653.1 g of a clear, colorless liquid. As a result of measuring the resulting silicone oligomer by GPC, the average molecular weight was 850, and the average degree of polymerization was 4.1 (preset degree of polymerization: 4.0). In addition, as a result of measuring the mercapto equivalent weight by an acetic acid/potassium iodide/potassium iodate addition/sodium thiosulfate solution titration method, the equivalent weight was 635 g/mol, and it was thus confirmed that the preset mercapto group content was achieved. The silicone oligomer obtained as described above is represented by the following average composition formula.

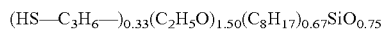

$(HS-C_3H_6-)_{0.33}(C_2H_5O)_{1.50}(C_8H_{17})_{0.67}SiO_{0.75}$

The resulting silicone oligomer was used as silicone oligomer 3.

(Silicone Oligomer 4)

After 553.0 g (2.0 mol) of octyl triethoxy silane and 757 g of ethanol were placed in a 3 L separable flask provided with a reflux condenser, a dropping funnel, and a thermometer, a mixed solution containing 24.3 g (1.35 mol) of 0.5 N—HCl aqueous solution and 56 g of ethanol was added in a dropwise manner at room temperature while stirring, and the solution was then stirred for 30 minutes at room temperature. After 238.4 g (1.0 mol) of γ-mercapto propyl triethoxysilane and 300 g of ethanol were further placed in a 1 L separable flask provided with an agitator, a reflux condenser, a dropping funnel, and a thermometer, a mixed solution containing 11.7 g (0.65 mol) of 0.5 N—HCl aqueous solution and 23 g of ethanol was added in a dropwise manner at room temperature while stirring and then stirred for 30 minutes at room temperature. The reaction solution was then added in a dropwise manner to the previous 3 L separable flask. After a mixed solution containing 9.0 g (0.50 mol) of 0.5 N—HCl aqueous solution and 21 g of ethanol was then added in a dropwise manner and stirred for 2 hours at 80° C., 21.4 g of a 5% KOH/EtOH solution was added in a dropwise manner and stirred for 2 hours at 80° C. The reaction solution was then distilled under reduced pressure and filtered to obtain 614.2 g of a clear, colorless liquid. As a result of measuring the resulting silicone oligomer by GPC, the average molecular weight was 1225, and the average degree of polymerization was 6.1 (preset degree of polymerization: 6.0). In addition, as a result of measuring the mercapto equivalent weight by an acetic acid/potassium iodide/potassium iodate addition/sodium thiosulfate solution titration method, the equivalent weight was 600 g/mol, and it was thus confirmed that the preset mercapto group content was achieved. The silicone oligomer obtained as described above is represented by the following average composition formula.

$(HS-C_3H_6-)_{0.33}(C_2H_5O)_{1.33}(C_8H_{17})_{0.67}SiO_{0.84}$

The resulting silicone oligomer was used as silicone oligomer 4.

<Production of the Rubber Composition for Tire Treads>

The components shown in Table 1 below (except for vulcanization accelerator and sulfur) were used in the amounts (parts by mass) shown in the same table, and the components were mixed for 5 minutes with a 1.7 L closed-type Banbury mixer. After the rubber was discharged to the outside of the mixer and cooled at room temperature, a vulcanization accelerator and sulfur were added to and mixed with the rubber using the Banbury mixer to produce a rubber composition for tire treads. The amounts of SBR1 and SBR2 in Table 1 are as follows: the upper values are the amounts (units: parts by mass) of SBR1 and SBR2 (oil extended products), and the lower values are the net amounts (units: parts by mass) of SBR contained in SBR1 and SBR2.

<Vulcanization>

The resulting rubber composition for tire treads was press-vulcanized under conditions of 30 minutes at 150° C. to obtain the targeted test piece.

<Evaluation>

The following evaluations were performed using the rubber composition for tire treads and the test piece obtained as described above (the test piece used in the evaluation of the Payne effect will be described in the section regarding the Payne effect). The results are shown in Table 1. The evaluation results are shown as indices using the results of Comparative Example 1 as a reference (reference value: 100).

Mooney scorch: Mooney scorch was measured at 100° C. in accordance with JIS K6300. Larger indices indicate superior scorchability (workability).

Payne effect: Vulcanization was performed for 20 minutes at 160° C. using unvulcanized rubber. The deformation shear force G' up to 0.28% to 30.0% deformation was measured, and the difference was displayed as an index. Smaller indices indicate superior silica dispersibility.

20° C. hardness: The hardness of the test piece was measured at 20° C. in accordance with JIS K6253. Larger indices indicate higher hardness.

tan δ: Measured using a viscoelasticity spectrometer manufactured by Iwamoto Seisakusho under the following conditions: elongation deformation strain rate=10%±2%, frequency=20 Hz, and temperature=0° C. and 60° C. Higher indices indicate higher values of tan δ. Higher values of tan δ at 0° C. yield superior stability on wet road surfaces. Higher values of tan δ at 60° C. yield a superior reduction in rolling resistance.

TABLE 1

| | Comparative Example 1 | Working Example 1 | Comparative Example 2 | Working Example 2 | Working Examples | | | | | | | | Comparative Example 3 |
|---|---|---|---|---|---|---|---|---|---|---|---|---|---|
| | | | | | 3 | 4 | 5 | 6 | 7 | 8 | 9 | 10 | |
| SBR1 | 96.3 (70) | 96.3 (70) | | 96.3 (70) | 96.3 (70) | 96.3 (70) | 96.3 (70) | 96.3 (70) | 96.3 (70) | 96.3 (70) | 96.3 (70) | 96.3 (70) | 96.3 (70) |
| SBR2 | | | 96.3 (70) | | | | | | | | | | |
| BR | 30.0 | 30.0 | 30.0 | 30.0 | 30.0 | 30.0 | 30.0 | 30.0 | 30.0 | 30.0 | 30.0 | 30.0 | 30.0 |
| Silica 1 (N₂SA 165 m²/g) | 70 | 70 | 70 | 70 | 65 | 65 | 70 | 70 | | 70 | 70 | 70 | 70 |
| Silica 2 (N₂SA 115 m²/g) | | | | | | | | | 70 | | | | |
| Carbon black 1 | 5 | 5 | 5 | 5 | 5 | 5 | 5 | 5 | 5 | 5 | 5 | 5 | 5 |

TABLE 1-continued

Table 1

| | Comparative Example 1 | Working Example 1 | Comparative Example 2 | Working Example 2 | Working Examples 3 | 4 | 5 | 6 | 7 | 8 | 9 | 10 | Comparative Example 3 |
|---|---|---|---|---|---|---|---|---|---|---|---|---|---|
| Silane coupling agent | 7.0 | | | | | | | | | | | | |
| Silicone oligomer 1 | | 7.0 | 7.0 | | 6.5 | | 10.0 | | 7.0 | | | 7.0 | |
| Silicone oligomer 2 | | | | 7.0 | | 6.5 | | 10.0 | | | | | |
| Silicone oligomer 3 | | | | | | | | | | 7.0 | | | |
| Silicone oligomer 4 | | | | | | | | | | | 7.0 | | |
| Silicone oligomer 5 | | | | | | | | | | | | | 7.0 |
| Polysulfide silane | | | | | | | | | | | | 2 | |
| Zinc oxide | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Antiaging agent | 3 | 3 | 3 | 3 | 3 | 3 | 3 | 3 | 3 | 3 | 3 | 3 | 3 |
| Aroma oil | 10 | 10 | 10 | 10 | 10 | 10 | 10 | 10 | 10 | 10 | 10 | 10 | 10 |
| Sulfur | 2 | 2 | 2 | 2 | 2 | 2 | 2 | 2 | 2 | 2 | 2 | 2 | 2 |
| Vulcanization accelerator CZ | 2 | 2 | 2 | 2 | 2 | 2 | 2 | 2 | 2 | 2 | 2 | 2 | 2 |
| Vulcanization accelerator DPG | 1 | 1 | 1 | 1 | 1 | 1 | 1 | 1 | 1 | 1 | 1 | 1 | 1 |
| Mooney scorch | 100 | 125 | 100 | 100 | 128 | 105 | 120 | 100 | 111 | 124 | 100 | 142 | 109 |
| Payne effect | 100 | 90 | 103 | 85 | 87 | 80 | 86 | 81 | 83 | 91 | 84 | 90 | 110 |
| Hardness at 20° C. | 100 | 105 | 105 | 101 | 102 | 100 | 104 | 101 | 100 | 104 | 101 | 106 | 100 |
| Tan δ at 0° C. | 100 | 101 | 105 | 102 | 102 | 104 | 103 | 105 | 103 | 102 | 101 | 101 | 100 |
| Tan δ at 60° C. | 100 | 93 | 104 | 88 | 85 | 82 | 90 | 86 | 88 | 93 | 87 | 92 | 108 |

The details of each component shown in Table 1 are as follows.

SBR1: "E581" manufactured by the Asahi Kasei Corporation; oil extended product (containing 37.5 parts by mass of extended oil per 100 parts by mass of SBR); styrene content: 40 mass %; vinyl bond content: 44%; weight-average molecular weight: 1,260,000

SBR2: "NipolNs460" manufactured by the Zeon Corporation; oil extended product (containing 37.5 parts by weight of extended oil per 100 parts by mass of SBR); styrene content: 27 mass %; vinyl bond content: 69%; weight-average molecular weight: 850,000

BR: "BR1220" manufactured by the Zeon Corporation

Silica 1: "Zeosil 1165 MP" manufactured by Rhodia; $N_2SA=165$ m$^2$/g

Silica 2: "Zeosil 115GR" manufactured by Rhodia; $N_2SA=115$ m$^2$/g

Carbon black 1: "Seast 6" manufactured by Tokai Carbon Co., Ltd.; $N_2SA=119$ m$^2$/g Silane coupling agent: "VPSi363" manufactured by Evonik Degussa Co., Ltd.

Polysulfide silane: "KBE-846" manufactured by Shin-Etsu Chemical Co., Ltd. (polysulfide silane represented by formula (4)) Here, $R^{41}$: —OC$_2$H$_5$; $R^{42}$: —(CH$_2$)$_3$—; m: 4)

Silicone oligomers 1 to 4: Silicone oligomers 1 to 4 produced as described above Silicone oligomer 5: NXT-Z-45 manufactured by Momentive Performance Materials Inc. (condensate oligomer consisting of 3-octanoyl thiopropyl alkoxysilane and 3-mercapto-propyl alkoxysilane at a molar ratio of 55:45)

Zinc oxide: Zinc Oxide #3 manufactured by Seido Chemical Industry Co., Ltd.

Stearic acid: Beads stearic acid manufactured by the NOF Corporation

Antiaging agent: "6PPD" manufactured by Flexsys

Aroma oil: Extract 4S (manufactured by Showa Shell Seikyu K.K.)

Sulfur: "Golden Flower Oil-treated Sulfur Powder" manufactured by Tsurumi Chemical Industry Co., Ltd.

Vulcanization accelerator CZ: "Nocceler GZ-G" manufactured by Ouchi Shinko Chemical Industry Co., Ltd.

Vulcanization accelerator DPG: Soccinol D-G" manufactured by Sumitomo Chemical Co., Ltd.

As is clear from the results shown in Table 1, Working Examples 1 to 10 are able to improve physical properties (stability on wet road surfaces, reduction of rolling resistance, and balance thereof) while ensuring or improving workability. Specifically, in comparison to Comparative Example 1, by adding a silicone oligomer, Working Example 1 demonstrates improved scorchability in comparison to conventional products and enables an improvement in tan δ balance while ensuring equivalent or better hardness. Working Examples 2, 8, and 9 are able to maintain or improve scorchability in comparison to conventional products and to improve the tan δ balance while ensuring equivalent or better hardness. Working Examples 3 and 4 are able to further reduce tan δ at 60° C. by reducing the amount of silica that is added less than in Working Examples 1 and 2. Working Example 5 demonstrates scorchability superior to that of conventional products even when the amount of the silicone oligomer that is added is greater than in Working Example 1. Working Example 6 is able to further reduce tan δ at 60° C. while maintaining scorchability even when the amount of the silicone oligomer that is added is greater than in Working Example 2. It can be seen from a comparison of Working Examples 1 and 7 that Working Example 1, which contains silica with an $N_2SA$ of 150 to 300 $m^2/g$, demonstrates superior workability. It can be seen from a comparison of Working Examples 1 and 10 that Working Example 10, which further contains the polysulfide silane described above, demonstrates superior workability and a greater reduction in rolling resistance.

In contrast, the rolling resistance increased in Comparative Example 2 in which the vinyl bond content in the conjugated diene of the diene rubber exceeded 50%. The physical properties were diminished in Comparative Example 3 containing a silicone oligomer other than a silicone oligomer represented by the siloxane average formula (1).

As described above, the rubber composition for tire treads according to the present invention demonstrates excellent stability on wet road surfaces and is able to reduce the rolling resistance while ensuring workability. The composition is able to improve physical properties to provide an excellent balance of these characteristics.

REFERENCE NUMERALS

1 Tread portion
2 Side wall portion
3 Bead portion
4 Carcass layer
5 Bead core
6 Bead filler
7 Inner liner layer
8 Belt layer
9 Belt cover layer
12 Tread rubber layer
13 Side rubber layer
14 Rim cushion rubber layer

What is claimed is:

1. A rubber composition for tire treads obtained by blending, per 100 parts by mass of a diene rubber, 5 to 150 parts by mass of silica and 0.5 to 20 parts by mass of a silicone oligomer represented by the following siloxane average formula (1):

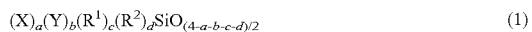

(wherein X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms), wherein in the siloxane average formula (1), a, b, c, and d each satisfy 0<a<0.5, 1.2<b<1.6, 0.5<c<1, and 0≤d≤0.1 and 0<a+b+c+d<4);
the diene rubber containing an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%.

2. The rubber composition for tire treads according to claim 1, wherein at least a portion of the silica is silica with an $N_2SA$ of 100 to 300 $m^2/g$.

3. The rubber composition for tire treads according to claim 1, wherein in the siloxane average formula (1), $R^1$ is the following organic group (2), and X is the following organic group (3):

4. The rubber composition for tire treads according to claim 1, wherein the weight average molecular weight of the silicone oligomer is from 500 to 2000.

5. The rubber composition for tire treads according to claim 1, wherein at least a portion of the silica is silica with an $N_2SA$ from 150 to 300 $m^2/g$.

6. A pneumatic tire having tire treads formed using the rubber composition for tire treads described in claim 1.

7. A rubber composition for tire treads obtained by blending, per 100 parts by mass of a diene rubber, 5 to 150 parts by mass of silica and 0.5 to 20 parts by mass of a silicone oligomer represented by the following siloxane average formula (1):

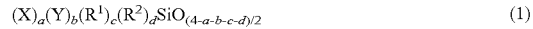

wherein X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms, wherein in the siloxane average formula (1), a, b, c, and d each satisfy 0<a<1, 0<b<2, 0<c<1, and 0≤d<1, and 0<a+b+c+d<4);
the diene rubber containing an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%, and further containing a silane having a polysulfide structure and a hydrolyzable group.

8. The rubber composition for tire treads according to claim 7, wherein at least a portion of the silica is silica with an $N_2SA$ of 100 to 300 $m^2/g$.

9. The rubber composition for tire treads according to claim 7, wherein in the siloxane average formula (1), $R^1$ is the following organic group (2), and X is the following organic group (3):

10. The rubber composition for tire treads according to claim 7, wherein in the siloxane average formula (1), a, b, c, and d each satisfy 0<a<0.5, 1.2<b<1.6, 0.5<c<1, and 0≤d≤0.1.

11. The rubber composition for tire treads according to claim 7, wherein the weight average molecular weight of the silicone oligomer is from 500 to 2000.

12. A pneumatic tire having tire treads formed using the rubber composition for tire treads described in claim 7.

13. A rubber composition for tire treads obtained by blending, per 100 parts by mass of a diene rubber, 5 to 150 parts by mass of silica and 0.5 to 20 parts by mass of a silicone oligomer represented by the following siloxane average formula (1):

wherein X is a mercapto group-containing organic group, Y is a hydrolyzable group, $R^1$ is a monovalent hydrocarbon group having from 4 to 10 carbon atoms, $R^2$ is a monovalent hydrocarbon group having from 1 to 3 carbon atoms, wherein in the siloxane average formula (1), a, b, c, and d each satisfy $0<a<1$, $0<b<3$, $0<c<2$, and $0 \leq d<2$, and $0<a+b+c+d<4$);

the diene rubber containing an aromatic vinyl-conjugated diene copolymer in an amount of at least 50 parts by mass per 100 parts by mass of the diene rubber, the aromatic vinyl-conjugated diene copolymer having an aromatic vinyl content of 20 to 45 mass % and a vinyl bond content in the conjugated diene of 10 to 50%, and further containing a silane having a polysulfide structure and a hydrolyzable group.

14. The rubber composition for tire treads according to claim 13, wherein in the siloxane average formula (1), $R^1$ is the following organic group (2), and X is the following organic group (3):

$$—C_8H_{17} \quad (2); \text{ and}$$

$$—C_3H_6SH \quad (3).$$

15. The rubber composition for tire treads according to claim 13, wherein the weight average molecular weight of the silicone oligomer is from 500 to 2000.

16. A pneumatic tire having tire treads formed using the rubber composition for tire treads described in claim 13.

17. The rubber composition for tire treads according to claim 13, wherein at least a portion of the silica is silica with an $N_2SA$ of 100 to 300 $m^2/g$.

* * * * *